(12) United States Patent
Clark et al.

(10) Patent No.: US 8,058,763 B2
(45) Date of Patent: Nov. 15, 2011

(54) ROTOR HAVING AN INVERTED U-SHAPED RETAINER AND MAGNET CARRIER

(75) Inventors: Paul Eaton Clark, Warwickshire (GB); Andrew James Bullock, Leicestershire (GB); Allan David Crane, Gwynedd (GB)

(73) Assignee: Converteam UK Ltd, Warwickshire (GB)

( * ) Notice: Subject to any disclaimer, the term of this patent is extended or adjusted under 35 U.S.C. 154(b) by 0 days.

(21) Appl. No.: 12/818,242

(22) Filed: Jun. 18, 2010

(65) Prior Publication Data
US 2011/0140561 A1 Jun. 16, 2011

Related U.S. Application Data

(63) Continuation-in-part of application No. 11/805,686, filed on May 24, 2007, now Pat. No. 7,768,169.

(30) Foreign Application Priority Data

May 27, 2006 (GB) .................................. 0610573.8

(51) Int. Cl.
*H02K 21/02* (2006.01)
*H02K 1/22* (2006.01)

(52) U.S. Cl. ......... 310/156.36; 310/156.11; 310/156.12; 310/156.13; 310/156.14; 310/156.15; 310/265; 310/216.082; 310/216.083; 310/266

(58) Field of Classification Search .......... 310/156.11–156.15, 156.26, 156.28, 310/156.29, 156.36, 156.48, 156.49, 265, 310/216.082, 216.083, 266; *H02K 21/12*, *H02K 1/06, 1/22*
See application file for complete search history.

(56) References Cited

U.S. PATENT DOCUMENTS

| | | | |
|---|---|---|---|
| 4,724,348 A | | 2/1988 | Stokes |
| 4,792,712 A | * | 12/1988 | Stokes .................. 310/156.21 |
| 4,855,630 A | * | 8/1989 | Cole ...................... 310/156.28 |
| 5,473,700 A | * | 12/1995 | Fenner, Jr. .................. 381/336 |
| 5,691,589 A | | 11/1997 | Keim et al. |
| 6,093,984 A | | 7/2000 | Shiga et al. |
| 6,452,301 B1 | * | 9/2002 | Van Dine et al. ........ 310/156.12 |
| 6,603,232 B2 | | 8/2003 | Van Dine et al. |
| 6,933,645 B1 | | 8/2005 | Watson |
| 7,030,530 B2 | * | 4/2006 | Malmberg ............... 310/156.28 |
| 7,768,169 B2 | * | 8/2010 | Clark ...................... 310/156.31 |
| 2003/0080640 A1 | | 5/2003 | Weiglhofer et al. |
| 2003/0085629 A1 | | 5/2003 | Van Dine et al. |
| 2003/0173851 A1 | | 9/2003 | Kudou et al. |

(Continued)

FOREIGN PATENT DOCUMENTS

JP 52053204 4/1977

(Continued)

*Primary Examiner* — Quyen Leung
*Assistant Examiner* — Terrance Kenerly
(74) *Attorney, Agent, or Firm* — Kirschstein, et al.

(57) ABSTRACT

A permanent magnet rotor arrangement that is particularly suitable for low-speed large-diameter electrical generators includes a rotor 2 having a radially outer rim 4. A circumferential array of magnet carriers 12 is non-releasably affixed to the outer rim 4 of the rotor and have a radially outer surface. An inverted U-shaped pole piece retainer 18 made of non-magnetic material such as stainless steel is affixed to each magnet carrier 12 and is formed with an axially extending channel. At least one pole piece 16 made of a magnetic material such as steel is located adjacent to the radially outer surface of each magnet carrier 12 and in the channel formed in its associated pole piece retainer 18.

20 Claims, 6 Drawing Sheets

U.S. PATENT DOCUMENTS

| | | | |
|---|---|---|---|
| 2004/0150281 A1* | 8/2004 | Malmberg | 310/156.28 |
| 2004/0201299 A1 | 10/2004 | Naritomi et al. | |
| 2005/0274518 A1* | 12/2005 | Collins et al. | 166/285 |
| 2006/0214528 A1* | 9/2006 | Nakahara et al. | 310/156.49 |
| 2007/0145848 A1* | 6/2007 | Nakahara et al. | 310/156.48 |
| 2008/0150385 A1* | 6/2008 | Silander | 310/156.28 |

FOREIGN PATENT DOCUMENTS

| | | |
|---|---|---|
| JP | 60200753 | 10/1985 |
| JP | 7116866 | 5/1995 |
| JP | 2006-034024 | 2/2006 |
| JP | 2006136088 | 5/2006 |
| WO | 02/103882 | 12/2002 |

* cited by examiner

ROTOR HAVING AN INVERTED U-SHAPED RETAINER AND MAGNET CARRIER

CROSS-REFERENCE TO RELATED APPLICATION

This application is a continuation-in-part of U.S. patent application Ser. No. 11/805,686, filed May 24, 2007, now allowed.

FIELD OF THE INVENTION

The present invention relates to a magnet retaining arrangement, and in particular to an arrangement for retaining permanent magnets on the outside of a permanent magnet rotor.

BACKGROUND OF THE INVENTION

EP 1309067 discloses a permanent magnet retaining arrangement that is suitable for high speed motors. The arrangement includes a rotor where a spaced array of pole pieces made of a laminated magnetic material are mechanically secured to the rim of the rotor by key members held by screws. A magnet is held in position between each pair of pole pieces by a slot wedge that is made of a non-magnetic material. The slot wedge includes grooves in its opposite edges for receiving projections formed on the adjacent pole pieces. An inverted U-shaped retainer is located in the space between the magnet and its associated slot wedge to enclose the magnet during high speed rotation of the rotor. The retainer is made of a non-magnetic material and has inner surfaces that conform to the rectangular periphery of the magnet, a radially outer surface that engages with the radially inner surface of the slot wedge and circumferential outer surfaces that conform to corresponding surfaces on the adjacent pole pieces. A circumferential outer wrap of fiber-reinforced polymer material surrounds the entire peripheral surface of the rotor structure.

This method of fixing is only really appropriate for rotors with pole pieces and magnets arranged so that the flux in the magnets passes predominantly in the circumferential direction. A disadvantage of this method is the need for high accuracy in the manufacture of the U-shaped retainers.

SUMMARY OF THE INVENTION

The present invention provides a permanent magnet rotor arrangement comprising a rotor having a rim, a circumferential array of magnet carriers affixed to the rim of the rotor in a non-releasable manner, each magnet carrier having a surface, an inverted U-shaped pole piece retainer made of non-magnetic material affixed to each magnet carrier and formed with a channel, and at least one pole piece made of permanent magnet material located adjacent to the surface of each magnet carrier and in the channel formed in its associated pole piece retainer.

The rotor arrangement can be such that the rotor is located within a fixed stator. In this case, the circumferential array of magnet carriers is preferably affixed to a radially outer rim of the rotor and each pole piece is preferably located adjacent to a radially outer surface of each magnet carrier. However, the rotor arrangement can also be such that the rotor is located outside a fixed stator. In this case, the circumferential array of magnet carriers is preferably affixed to a radially inner rim of the rotor and each pole piece is preferably located adjacent to a radially inner surface of each magnet carrier.

Clearances between the pole pieces and the pole piece retainers can be filled with any suitable non-metallic material such as epoxy resin, with or without a filler, polymers such as polyurethane and polyesters, and vacuum impregnated fibers or felt, for example.

The rotor arrangement of the present invention is particularly suitable for rotors in which the flux passes through the pole pieces predominantly in the radial direction. A flux path can be provided between circumferentially adjacent pole pieces through the rotor rim. The advantages of the rotor arrangement are simplicity of construction and the ability to pre-assemble complete pole arrangements. The pole pieces are not designed to be removed and replaced. It is anticipated that any serious fault can be addressed by replacing the entire electrical machine and there is no specific requirement to replace any individual magnet carrier(s) while the electrical machine remains in situ. The requirements for the dimensional tolerances of the pole piece retainers are modest resulting in low manufacturing costs.

Each magnet carrier is preferably located in the channel of its associated pole piece retainer. Each magnet carrier and its associated pole piece retainer preferably extend axially along the outer rim of the rotor.

An axial array of pole pieces of magnetic material is preferably located adjacent to the surface of each magnet carrier and in the channel formed in its associated pole piece retainer. The pole pieces associated with each magnet carrier and pole piece retainer can be located in abutment with each other in the axial direction.

The magnet carriers are preferably made of magnetic material such as steel, for example.

Each magnet carrier can be mounted in a recess in the rotor rim.

The magnet carriers can be permanently affixed to the rotor rim using any suitable means.

Mechanical fixings such as screws or bolts can be used. The mechanical fixings can be shear bolts where the head portion is designed to shear off when the bolt is tightened to leave a low profile head that cannot be engaged with a standard tool making the shear bolts non-releasable. A combination of shear bolts and conventional releasable mechanical fixings can be used to secure each individual magnet carrier to the rotor rim.

The threads of the mechanical fixings can be coated in a permanent threadlocking agent such as LOCTITE® as supplied by Henkel Corporation of 1001 Trout Brook Crossing, Rocky Hill, Conn. 06067 or an equivalent adhesive.

At least a part of each mechanical fixing can be permanently secured to the rotor rim by being adhesively bonded or welded to the rotor rim. For example, a head portion of each mechanical fixing can be welded to the rotor rim around at least part of its periphery.

The mechanical fixings can be rendered inaccessible so that they cannot be released from the rotor rim. For example, the head portion of each mechanical fixing can be located in a respective recess in the rotor rim and a cover can then permanently secured over the recess to prevent access to it. The cover can be secured to the rotor rim by any suitable means such as welding.

The magnet carriers can be adhesively bonded to the radially outer rim of the rotor using any suitable adhesive.

The pole piece retainers are preferably made of a non-magnetic material such as stainless steel or glass-reinforced epoxy resin, for example.

Each pole piece retainer can be affixed to its associated magnet carrier using any suitable means. For example, the pole piece retainer can be affixed using mechanical fixings such as screws or bolts. The pole piece retainer can also be adhesively bonded or welded directly to its associated magnet carrier or clipped into position. In the latter case, it is possible for each pole piece retainer to be affixed to its associated magnet carrier by engaging a part of the pole piece retainer with or behind a part of the magnet carrier. A combination of one or more fixing means can be used.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
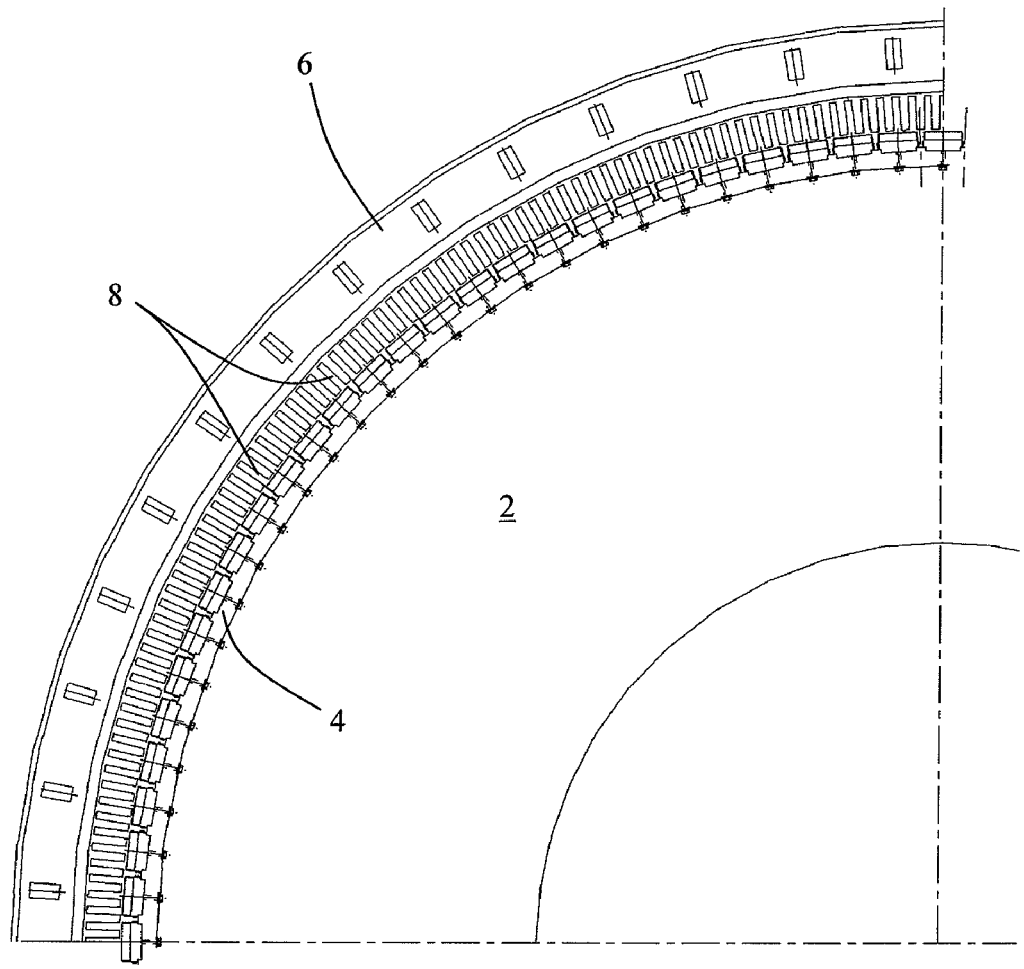
FIG. 1 is a partial axial cross section view of a permanent magnet rotor arrangement according to a first embodiment of the present invention.
Figure 2:
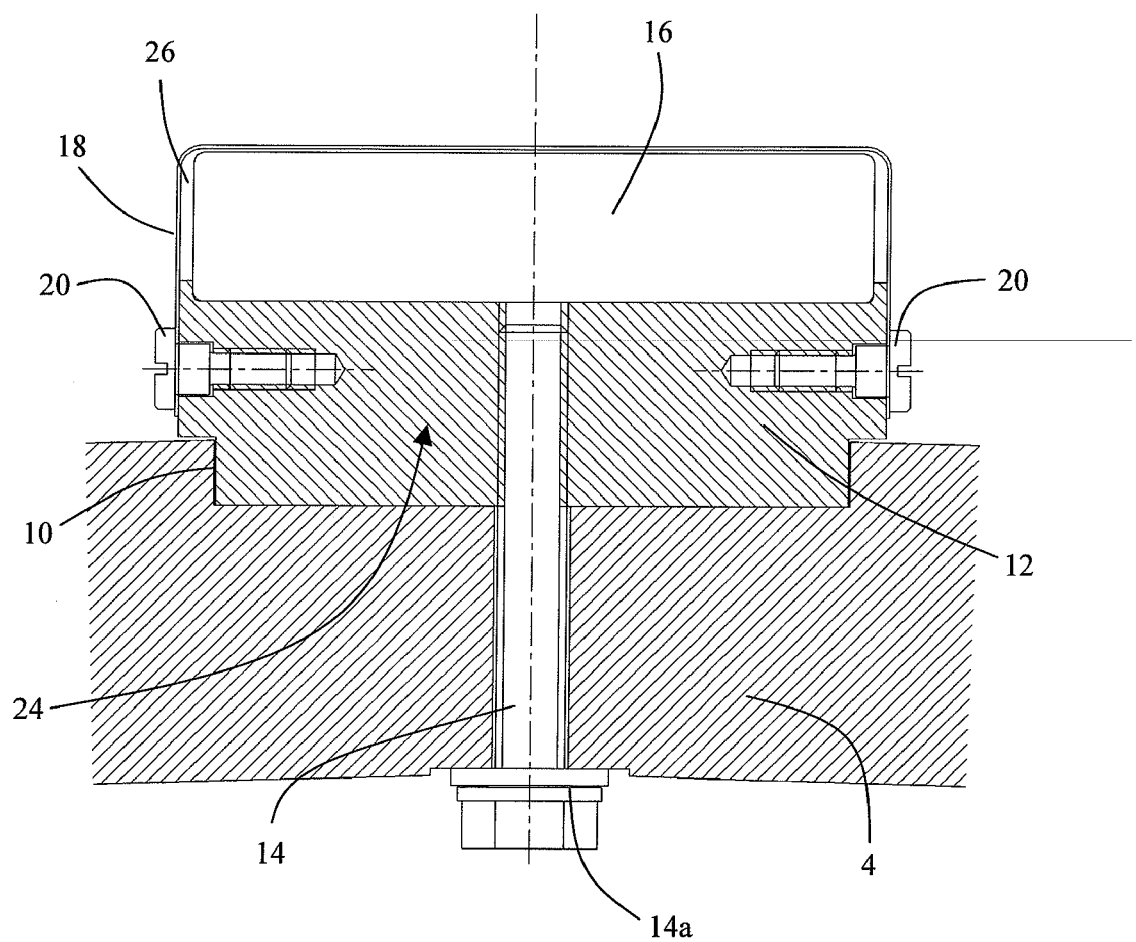
FIG. 2 is a detail view of the permanent magnet rotor arrangement of FIG. 1.
Figure 3:
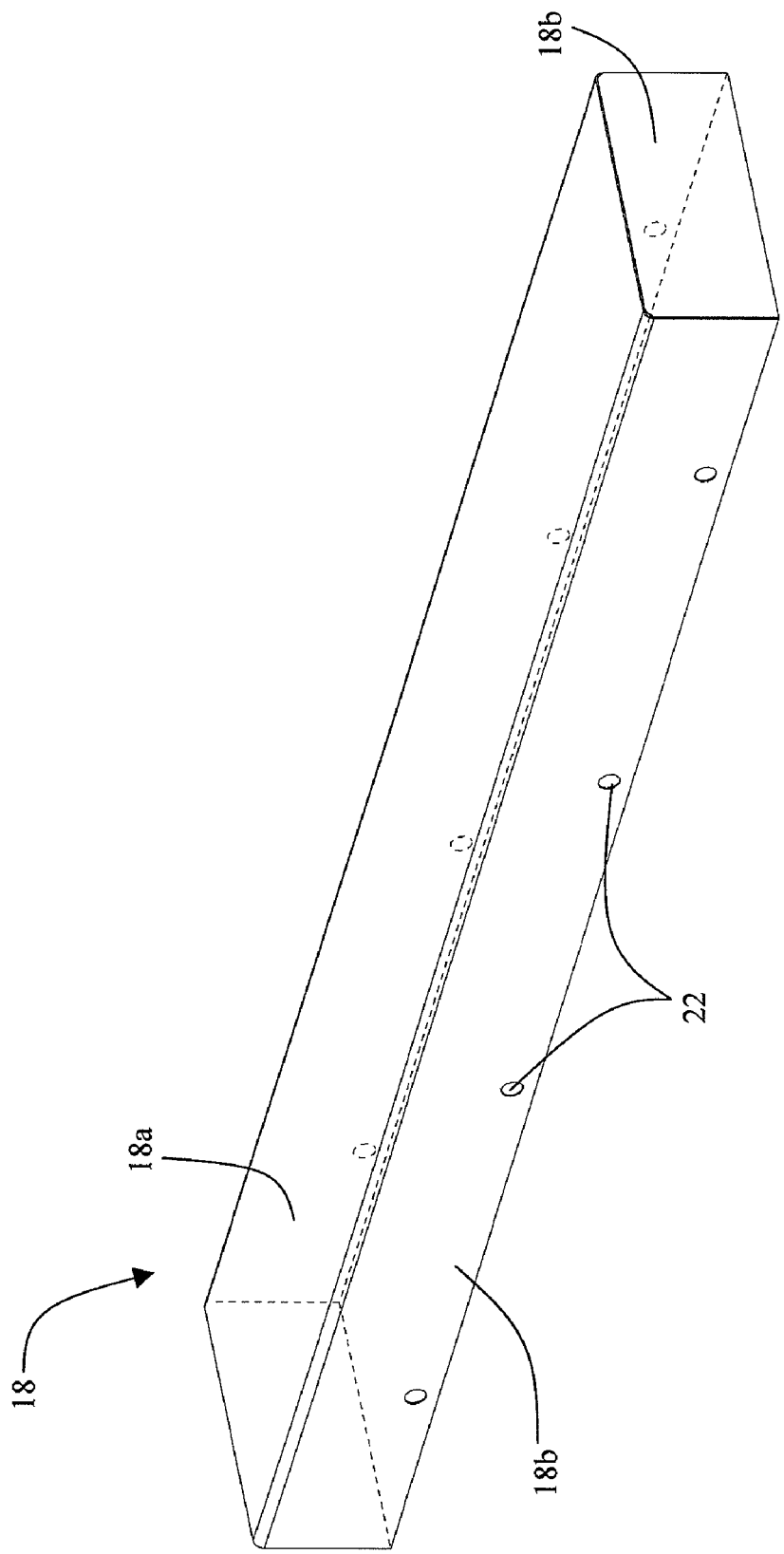
FIG. 3 is a perspective view of the pole piece retainer that forms part of the permanent magnet rotor arrangement of FIGS. 1 and 2.

With reference to FIGS. 1 to 6, a permanent magnet rotor arrangement for a low-speed large-diameter electrical generator includes a rotor 2 having an outer rim 4 that is mounted to rotate within a fixed stator 6 having a circumferential array of slots 8 formed in its radially inner surface.

The radially outer surface of the rim 4 includes a circumferential array of axially-extending recesses 10. An axially-extending bar or magnet carrier 12 made of a magnetic material such as steel is located in each of the recesses. Each magnet carrier 12 is permanently secured to the rim 4 of the rotor 2 by a series of axially spaced bolts 14 that extend radially through apertures in the rim into screw-threaded apertures in the magnet carrier. In FIGS. 1 to 4 the head portion 14a of each bolt 14 is welded to the rim 4 so that the magnet carriers 12 are permanently secured to the rotor. The weld line may extend around all or part of the periphery of the head portion 14a. In FIG. 5 the head portion 14a of each bolt 14 is located in a recess 30 in the rim 4. The recess 30 is closed by a plate or cover 32 that is permanently secured to the rim 4 by welding to render the head portion 14a inaccessible. The thread of each bolt 14 can be coated in a permanent thread-locking agent such as LOCTITE® as supplied by Henkel Corporation of 1001 Trout Brook Crossing, Rocky Hill, Conn. 06067 or an equivalent adhesive before it is inserted into the rim 4. A suitable adhesive can also be applied between the magnet carrier 12 and the rim 4.

Figure 4:
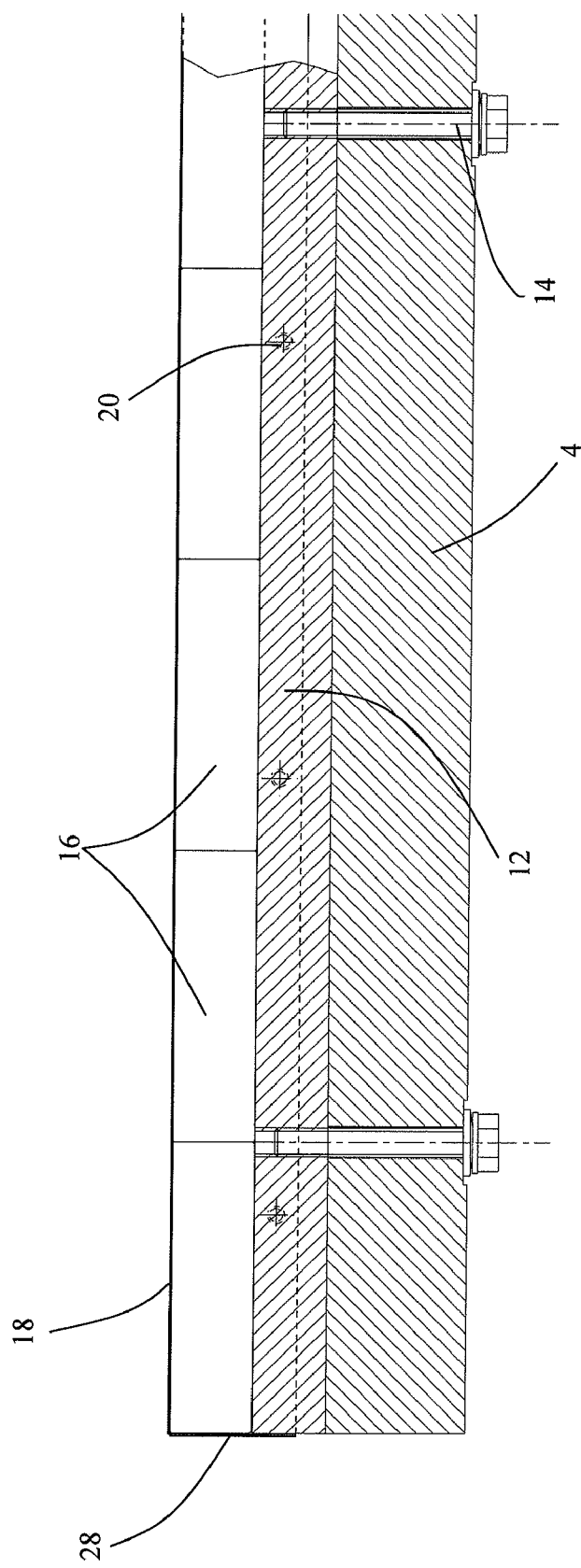
FIG. 4 is a partial radial cross section view showing the pole piece retainer, magnet retainer, rotor rim and an axial array of pole pieces that form part of the permanent magnet rotor arrangement of FIGS. 1 and 2.
Figure 5:
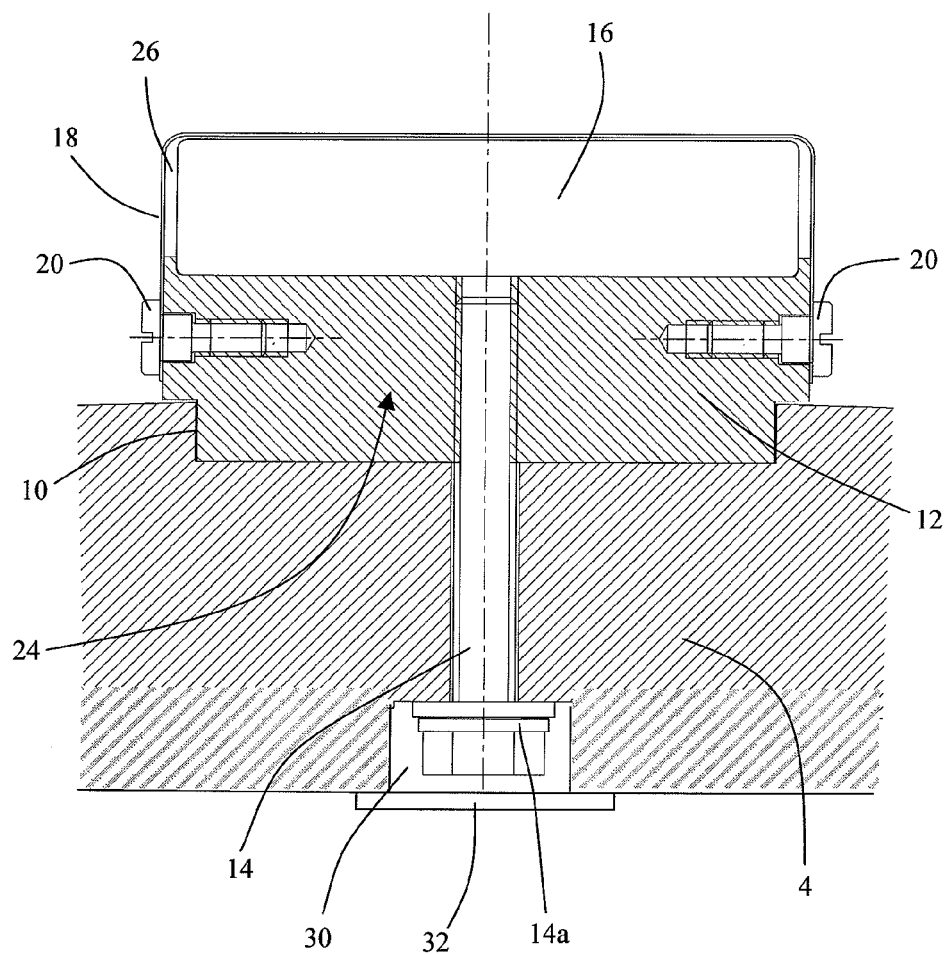
FIG. 5 is a partial cross section view of a permanent magnet rotor arrangement according to a second embodiment of the present invention.

As best shown in FIG. 4, an axial array of permanent magnet pole pieces 16 are positioned on top of each of the magnet carriers 12 and are held in position by an axially-extending pole piece retainer 18. The pole pieces 16 sit in a shallow recess formed in the radially outer surface of the underlying magnet carrier 12 and are in abutment with each other in the axial direction. Each pole piece retainer 18 has an inverted U-shape configuration such that it has a circumferentially extending surface 18a that is separated from the radially inner surface of the stator 6 by an air gap. Each pole piece retainer 18 also includes two radially extending sidewalls 18b that are secured to the associated magnet carrier 12 on both sides by a series of axially spaced screws 20. The screws 20 extend circumferentially through apertures 22 in the sidewalls 18b of the pole piece retainer 18 into screw-threaded apertures in the side of the magnet carrier 12. Although not shown in the drawings, the free edge of each sidewall 18b may terminate in an inwardly facing flange that in use lies between the magnet carrier and the radially outer surface of the rim. When the pole piece retainer 18 is secured to the associated magnet carrier 12, the surfaces 18b extend alongside the radially outer surfaces of the axial array of pole pieces 16 and radially inner parts of the sidewalls 18b lie against the side surfaces of the magnet carrier 12. The two sidewalls 18b therefore define an axially extending channel 24 that is filled by the magnet carrier 12 and the axial array of pole pieces 16. Radially outer parts of the sidewalls 18b that are aligned with the pole pieces 16 are separated from the side surfaces of the pole pieces by a small gap 26. This gap 26 accommodates the radius in the corner of each pole piece retainer 18 and minimizes the need to chamfer the corners of the pole pieces 16. In order to provide a reliable reaction surface for the circumferential surfaces acting on the pole pieces 16, the gap 26 is filled with any suitable non-metallic material such as epoxy resin, with or without a filler, polymers such as polyurethane and polyesters, and vacuum impregnated fibers or felt, for example.

Conventionally, the pole pieces 16 are bonded to the magnet carriers 12 with an adhesive but the long-term efficacy of this is not guaranteed and one of the purposes of the pole piece retainers is therefore to retain the magnets that become detached from the magnet carriers.

Each pole is usually formed from an axial array of pole pieces 16 that would tend to move apart axially if the adhesive bond with the associated magnet carrier 12 failed (or if the assembly were made without the use of adhesive at all). The pole piece retainers 18 may therefore have closed ends (one of which 28 is shown in FIG. 4) to prevent this movement. Alternatively, end-stops can be incorporated into the magnet carriers 12, or bolted or otherwise secured to either the magnet carriers or the rim of the rotor 2. Other options for preventing axial movement of the pole pieces 16 relative to the associated magnet carrier 12 and pole piece retainer 18 can be employed.

The pole piece retainers 18 can be formed from any non-magnetic material such as stainless steel or glass-reinforced epoxy resin, for example.

In an alternative arrangement that is not shown, the pole piece retainer 18 can be adhered, welded, clipped or otherwise secured to its associated magnet carrier 12 without the need for the screws. For example, the free ends of the sidewalls 18b can be adapted to be engaged with complementary features such as recesses formed on the side surfaces of the magnet carrier 12.

Figure 6:
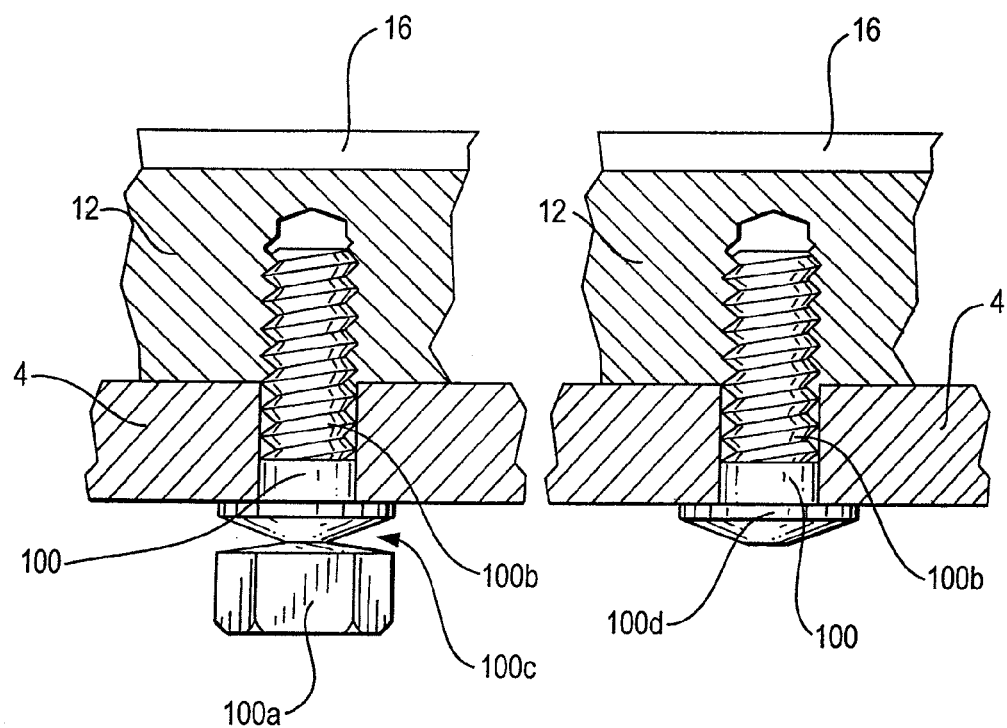
FIG. 6 is a partial cross section view of a permanent magnet rotor arrangement according to a third embodiment of the present invention where shear bolts are used to secure the magnet carriers to the outer rim of the rotor.

With reference to FIG. 6, each magnet carrier 12 can be permanently secured to the rim 4 of the rotor by a series of axially spaced shear bolts 100. Each shear bolt 100 includes a head portion 100a, which may take the form of a conventional hex head, and a threaded shaft 100b. Between the head portion 100a and the threaded shaft 100b is a radial undercut 100c. The shear bolt 100 is screwed into the rim 4 and the magnet carrier 12 until it shears at the region of the undercut 100c once the shearing torque is exceeded. Shearing off the head portion 100a leaves a low profile head 100d that cannot be engaged by a conventional tool. The thread of each shear bolt 100 can be coated in a permanent threadlocking agent such as LOCTITE® as supplied by Henkel Corporation of 1001 Trout Brook Crossing, Rocky Hill, Conn. 06067 or an equivalent adhesive before it is inserted into the rim 4.

The shear bolts 100 can be interspersed with conventional bolts of the type described above with reference to FIGS. 1 to 5. In other words, not all of the mechanical fixings that are used to permanently secure each magnet carrier 12 to the rim 4 need to be shear bolts 100. The conventional bolts can be releasable from the rim 4.

What is claimed is:

1. A permanent magnet rotor arrangement comprising:
   a rotor having a rim;
   a circumferential array of magnet carriers affixed to the rim of the rotor in a non-releasable manner, each magnet carrier having a surface;
   an inverted U-shaped pole piece retainer made of non-magnetic material affixed to each magnet carrier and formed with a channel; and
   at least one pole piece made of permanent magnet material located adjacent to the surface of each magnet carrier and in the channel formed in its associated pole piece retainer.

2. The permanent magnet rotor arrangement according to claim 1, wherein the circumferential array of magnet carriers is affixed to a radially outer rim of the rotor and the at least one pole piece is located adjacent to a radially outer surface of each magnet carrier.

3. The permanent magnet rotor arrangement according to claim 1, wherein the circumferential array of magnet carriers is affixed to a radially inner rim of the rotor and the at least one pole piece is located adjacent to a radially inner surface of each magnet carrier.

4. The permanent magnet rotor arrangement according to claim 1, wherein each magnet carrier is located in the channel of its associated pole piece retainer.

5. The permanent magnet rotor arrangement according to claim 1, wherein each magnet carrier and its associated pole piece retainer extends axially along the rotor rim.

6. The permanent magnet rotor arrangement according to claim 1, further comprising an axial array of pole pieces of magnetic material located adjacent to the surface of each magnet carrier and in the channel formed in its associated pole piece retainer.

7. The permanent magnet rotor arrangement according to claim 1, wherein the magnet carriers are made of magnetic material.

8. The permanent magnet rotor arrangement according to claim 1, wherein the magnet carriers are made of steel.

9. The permanent magnet rotor arrangement according to claim 1, wherein each magnet carrier is mounted in a recess in the rotor rim.

10. The permanent magnet rotor arrangement according to claim 1, wherein the magnet carriers are permanently affixed to the rotor rim using mechanical fixings.

11. The permanent magnet rotor arrangement according to claim 10, wherein the mechanical fixings are shear bolts.

12. The permanent magnet rotor arrangement according to claim 10, wherein the mechanical fixings are adapted to be permanently secured to the rotor rim or rendered inaccessible so that they cannot be released from the rotor rim.

13. The permanent magnet rotor arrangement according to claim 12, wherein at least a part of the mechanical fixings is welded to the rotor rim.

14. The permanent magnet rotor arrangement according to claim 1, wherein the pole piece retainers are made of stainless steel.

15. The permanent magnet rotor arrangement according to claim 1, wherein each pole piece retainer is affixed to its associated magnet carrier using mechanical fixings.

16. The permanent magnet rotor arrangement according to claim 15, wherein the mechanical fixings are screws.

17. The permanent magnet rotor arrangement according to claim 1, wherein each pole piece retainer is welded to its associated magnet carrier.

18. The permanent magnet rotor arrangement according to claim 1, wherein each pole piece retainer is adhesively bonded to its associated magnet carrier.

19. The permanent magnet rotor arrangement according to claim 1, wherein each pole piece retainer is affixed to its associated magnet carrier by engaging a part of the pole piece retainer with or behind a part of the magnet carrier.

20. The permanent magnet rotor arrangement according to claim 1, wherein each pole piece is configured such that magnetic flux generated by the respective pole piece passes through the respective pole piece and the respective magnet carrier in a predominantly radial direction into the rotor rim.

* * * * *